United States Patent Office 3,462,529
Patented Aug. 19, 1969

3,462,529
COMPOSITIONS CONTAINING SALTS OF 5'-PHOS-PHO-N$^\epsilon$-PYRIDOXYLIDENE-LYSINE
Edmond Forget, Sierne, Geneva, Switzerland, assignor to Etablissement Kogerim, Vaduz, Liechtenstein
No Drawing. Filed June 8, 1966, Ser. No. 555,991
Claims priority, application Switzerland, June 9, 1965, 8,025/65
Int. Cl. A61k 19/02; C07f 9/68
U.S. Cl. 424—200                 4 Claims

ABSTRACT OF THE DISCLOSURE

As a pharmaceutical composition for the treatment of a deficiency of pyridoxal phosphate, the sodium or potassium salt of 5'-phospho-N$^\epsilon$-pyridoxylidene-lysine in an inert carrier. The composition is administered at a dosage rate from 25 to 500 mg. of the alkali salt in 24 hours.

---

The invention relates to new, biologically active forms of pyridoxine coenzymes possessing all the pharmacological properties of vitamin B$_6$ and to a method for their preparation and therapeutic use.

Vitamin B$_6$ is known to be involved biologically in the majority of metabolic processes as a coenzyme of very many enzymes. Among the most important of these are the transaminases, the amino-acid decarboxylases, the racemases and the phosphorylases.

The biologically active form of vitamin B$_6$ is pyridoxal-5'-phosphate. Phosphorylation at position 5' and the presence of an aldehyde group at position 4 are indispensable conditions for enzymic activity.

The coenzyme-apoenzyme linkage has been the subject of several scientific studies. It has been shown by hydrolysis of large enzyme molecules (e.g. crystallized phosphorylase) that this linkage led to a chemical reaction between the aldehyde group of pyridoxal-5'-phosphate and an amino-group belonging to a preferential amino-acid of the large protein molecule of the apoenzyme. This linkage produces a Schiff's base of the type 5'-phosphopyridoxylidene amino-acid.

The reality of this biologically active chemical form has been well proven but its isolation and synthesis as a stable product suitable for clinical application in man has hitherto never been achieved.

Indeed, up till now the only compounds isolated have been the heavy metal chelates (Ni, Cu, Co) of Schiff's bases obtained by combining pyridoxal or pyridoxal-5'-phosphate with various amino-acids, but these compounds can have no therapeutic application by virtue of their toxicity and insolubility.

According to the invention there are provided, stable and active forms of pyridoxine coenzymes having the following general formula:

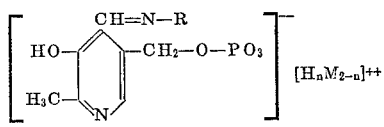

in which R is such that RNH$_2$ represents a monoamino-acid or diamino-acid containing one or two carboxyl groups, or, an ester of such acid, or an amine of such acid; $n$ is a number assuming the value 0 when RNH$_2$ is a monoamino or diamino dicarboxylic acid and the value 1 in other cases; and M represents an alkali metal.

In the case where R stands for groups to which corresponds a value of $n$ equal to 1 in accordance with the above definition, the general formula will be written:

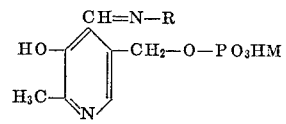

In the case where $n$ is equal to 0, the general formula will be written:

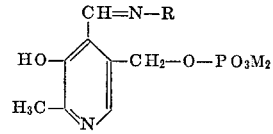

These compounds are prepared by contacting together at room or ambient temperature and in a alcoholic medium the RNH$_2$ derivative, pyridoxal-5'-monophospate and in alkaline base in substantially the stoichiometric proportions corresponding to the general formula as defined above.

The Schiff's base thus isolated are yellow in color. They are very soluble in water. In methyl alcohol solutions they show a characteristic absorption maximum in the ultra-violet either at 245 and 260 m$\mu$, or at 400–415 m$\mu$, or both. Their infrared spectrum is equally characteristic.

In particular, when the amino-acid corresponding to the enzymes studied is preferentially L-lysine which is thus detached from the apoenzyme and attached to the coenzyme by its —NH$_2$ group, the Schiff's base thus formed has enzymic properties which are much superior to those of pyridoxal-5'-phosphate alone.

The Schig's base thus produced shows a three-fold advantage over pyriodoxal-5'-phosphate by virtue of the fact that (1) It has a much greater stability which permits its use in therapeutics;

(2) It is very soluble in water;

(3) It has greatly superior enzymic activity.

It has been possible to demonstrate the greater reactivity of the Schiff's base compared with that of pyridoxal or pyridoxal phosphate by a study of the reaction velocities in the process of the formation of the semicarbazone starting from semicarbazide. For example, at pH 7.34 the reaction velocity is approximately 30 times greater with the Schiff's base than pyridoxal alone.

The preparation of the new compounds is illustrated in the following examples:

EXAMPLE 1

$n=1$     $M=K$

Monopotassium salt of 5'-phospho-N$^\epsilon$-pyridoxylidene-L-lysine

To one gram-molecule (146.19 g.) of L-lysine dissolved in one litre of a normal methanolic solution of potassium hydroxide, one gram-molecule (247.15 g.) of pyridoxal-5'-monophosphate was added, progressively with stirring. After 30 minutes the Schiff's base precipitated out in the form of its potassium salt.

The mixture was centrifuged after 3 hours stirring. The precipitate was washed in methyl alcohol and then with anhydrous ethyl ether, after which it was dried under vacuum. Yield: 70%.

EXAMPLE 2

$n=0$     $M=Na$

Disodium salt of 5'-phosphopyridoxylidene-L-2-amino-butane-1,4-dioic acid (Schiff's base of L-aspartic acid)

To one gram-molecule (133.10 g.) of L-aspartic acid hydroxide in methyl alcohol, one gram-molecule (247.15 g.) of pyridoxal-5'-monophosphate was added progressively with stirring.

After 30 minutes the Schiff's base precipitated out in the form of its disodium salt. It was centrifuged after 3 hours stirring. The salt was washed with methyl alcohol and then with anhydrous ethyl ether, after which it was dried under vacuum. Yield: 72%.

EXAMPLE 3

$n=1 \quad M=K$

Monopotassium salt of 5'-phosphopyridoxylidene tetraethyl aspartamide

To one litre of a normal methanolic solution of potassium hydroxide one gram-molecule (247.15 g.) of pyridoxal-5'-monophosphate was added. After 10 minutes one gram-molecule (243.34 g.) of N,N,N'-tetraethylaspartamide dissolved in methyl alcohol was progressively added with stirring. After 4 hours stirring, the mixture was evaporated under vacuum.

The residue was treated with a mixture consisting of equal parts of ethyl ether and petroleum ether. The insoluble fraction which consists of the monopotassium salt of the Schiff's base, was centrifuged off. The salt was washed with the mixture of the said two solvents and dried. Yield: 80%.

By this process the following compounds have been prepared:

1. (a) Monopotassium salt of 5'-phospho-N$^\epsilon$-pyridoxylidene-L-lysine $$R = -CH_2(CH_2)_3 - \underset{\underset{NH_2}{|}}{CH} - COOH$$

$n=1 \quad M=K$

Theoretical: C, 40.67; H, 5.12; O, 27.09; N, 10.16; P, 7.49; K, 9.46. Found: C, 40.52; H, 5.20; O, 27.15; N, 10.05; P, 7.47; K, 9.21.

(b) Monopotassium salt of 5'-phospho-N$^\epsilon$-pyridoxylidene-DL-lysine

Theoretical: C, 40.67; H, 5.12; O, 27.09; N, 10.16; P, 7.49; K, 9.46. Found: C, 40.55; H, 5.15; O, 27.20; N, 10.02; P, 7.44; K, 9.28.

2. Monopotassium salt of 5'-phosphopyridoxylidene-4-aminobutane-1-oic acid (Schiff's base of γ-aminobutyric $R=-CH_2(CH_2)_2COOH; \quad n=1; \quad M=K$ Theoretical: C, 38.91; H, 4.35; O, 30.24; N, 7.56; P, 8.36; K, 10.55. Found: C, 38.87; H, 4.31; O, 30.31; N, 7.58; P, 8.57; K, 10.46.

3. (a) Monopotassium salt of 5'-phosphopyridoxylidene-L-α-alanine $$R = CH_3 - \underset{|}{CH} - COOH$$

$n=1 \quad M=K$

Theoretical: C, 37.08; H, 3.96; O, 31.43; N, 7.86; P, 8.69; K, 10.97. Found: C, 37.15; H, 3.76; O, 31.32; N, 7.90; P, 8.66; K, 10.88.

(b) Monopotassium salt of 5'-phospho-pyridoxylidene-DL-α-alanine

Theoretical: C, 37.08; H, 3.96; O, 31.43; N, 7.86; P, 8.69; K, 10.97. Found: C, 37.15; H, 3.99; O, 31.34; N, 7.90; P, 8.66; K, 10.88.

4. (a) Dipotassium salt of 5'-phosphopyridoxylidene-L-2-aminobutane-1,4-dioic acid (Schiff's of L-aspartic acid)

$$R = HOOC - \underset{|}{CH} - CH_2 - COOH$$

$n=0 \quad M=K$

Theoretical: C, 32.87; H, 2.99; O, 32.84; N, 6.39; P, 7.06; K, 17.83. Found: C, 32.76; H, 3.10; O, 32.70; N, 6.48; P, 7.16; K, 17.90.

(b) Dipotassium salt of 5'-phosphopyridoxylidene-DL-2-aminobutane-1,4-dioic acid Theoretical: C, 32.87; H, 2.99; O, 32.84; N, 6.39; P, 7.06; K, 17.83. Found: C, 32.78; H, 3.04; O, 32.76; N, 6.23; P, 7.03; K, 17.75.

(c) Disodium salt of 5'-phosphopyridoxylidene-DL-2-aminobutane-1,4-dioic acid $$R = HOOC - \underset{|}{CH} - CH_2 - COOH$$

$n=0 \quad M=Na$

Theoretical: C, 35.48; H, 3.22; O, 35.45; N, 6.89; P, 7.62; Na, 11.32. Found: C, 35.22; H, 3.29; O, 35.31; N, 6.80; P, 7.56; Na, 11.14.

5. Monopotassium salt of 5'-phosphopyridoxylidene tetraethyl aspartamide $$R = \underset{H_5C_2}{\overset{H_5C_2}{\diagdown}} N OC - \underset{|}{CH} - CH_2 - CO N \underset{C_2H_5}{\overset{C_2H_5}{\diagup}}$$

$n=1 \quad M=K$

Theoretical: C, 47.04; H, 6.31; O, 21.93; N, 10.97; P, 6.06; K, 7.65. Found: C, 47.10; H, 6.22; O, 21.75; N, 10.88; P, 6.02; K, 7.56.

The results of pharmocological and clinical trials with the Schiff's base of lysine (BSL) in the form in which is was produced by the method described in Example 1, are hereinafter given by way of example.

As to toxicity, the $LD_{50}$ (24 hours) of BSL by the intravenous route in mice is 0.425 g./kg.

PHARMACOLOGICAL TRIALS

The deficiency syndromes observed in animals resulting either from a vitamin deficiency or from the ingestion of 4-desoxypyridoxine rapidly disappear when these animals are treated with BSL.

The protective action of BSL against the action of hydrazides in general, monomethyl hydrazide, dimethyl hydrazide and, in particular, isoniazid has been studied. The disorders produced by these substances are generally neurological (epileptic attacks) and occasion high mortality rates in animals. The administration of BSL produces a marked diminution of the mortality rate. The protective activity is about 40 to 60% higher than that of pyridoxine.

In general BSL can be used for all disorders associated with a deficiency of pyridoxal phosphate (tuberculous disease treated with INAH, i.e. isoniazid, polyneuritic syndromes, atheromatous vascular disorders, epilepsy).

CLINICAL OBSERVATIONS

Case History No. 1—Mr. R. Aet. 44

Bilateral apical pulmonary TB treated for 3 months with streptomycin, PAS and high doses of INAH (600 mg. orally and 400 mg. intramuscularly).

Rapid onset of severe psychiatric disturbance (hypomanic excitement, delirium) and attacks of generalized epilepsy.

The EEG showed bursts of multiple-spike waves with slowing of the basal rhythm.

The deficiency of pyridoxal phosphate (due to the INAH) was proved by the tryptophane load test which showed a markedly increased excretion of xanthurenic acid (95 mg./24 hr.).

Treatment.—BSL: 200 mg./24 hr. at first intramuscularly (for 7 days) and then orally. Reduction of the INAH dosage: 0.500 g./24 hr.

Results.—Rapid return to normal of the EEG tracing in 10 days.

Return to normal of the tryptophane load test in 4 days.

Rapid regression of the behavioral disorders and epileptic attacks (the latter have not recurred).

Conclusion.—Typical case of neurological disorder due to INAH toxicity. Notable and rapid effect of the drug (BSL).

Simultaneous continuation of treatment with INAH for 3 months without recurrence of pyridoxal deficiency.

Case History No. 2—Mrs. C. Aet. 48

Alcoholic polyneuritis of the lower limbs.
Amyotrophy; marked motor loss of the anterior and lateral columns.
Loss of knee and ankle jerks.
Stocking hypoaesthesia. Calf pains.
Severe chronic alcoholism. Malnutrition.
Tryptophane load test: markedly abnormal; 70 and 65 mg. of xanthurenic acid excreted per 24 hr.
Raised blood pyruvate: 17 mg./l.
Treatment.—BSL: 250 mg./24 hr. together with 500 mg. of vitamin $B_1$ in view of the associated thiamine deficiency. Period of treatment: 3 months.
Results.—Rapid alleviation of the pains. Progressive recovery of muscle power. Recovery of knee jerks at the end of 2 months.

Case History No. 3—Mr. V. Aet. 71

Arteritis of lower limbs for 4 years.
Myocardial infarct 2 years ago.
Fundus oculi: tortuous narrowed arteries, nipping at arterio-venous crossings.
Arcus senilis present.
Hypercholesterolaemia (3.40 g./l.).
Treatment.—BSL: 250 mg./24 hr. for one month.
Results.—Lowering of the blood cholesterol (2.7 g./l.). Subjective improvement.

Case History No. 4—Mrs. D. Aet. 24

Intractable hyperemesis gravidarum (for 7 weeks).
Dehydration and undernourishment.
Tryptophane load test abnormal (64 mg. of xanthurenic acid excreted per 24 hr.)
Treatment.—Intravenous fluids to combat depletion. Daily injection of BSL 50 mg. for 7 days.
Results.—Extremely rapid improvement of the patient's general condition. Cessation of vomiting.

Case History No. 5—Miss C. Aet. 29

Petit mal from the age of 9 and generalized epilepsy. One or two attacks a year.

Treated with phenobarbitone 0.15 g. and three 0.30 g. tablets of 3,5,5-trimethyloxazolidine-2,4-dione (troxidone).

Recrudescence of attacks (2 per week) for the past two months without change of treatment.

Tryptophane load test: 47 mg. of xanthurenic acid excreted per 24 hr.

Treatment.—Additional medication with BSL 150 mg./24 hr. for 6 months.

Results.—Complete cessation of generalized attacks. Patient seen again at the end of 1 year (one attack only during this period).

Case History No. 6—Mr. T. Aet. 67

Idiopathic tremor from the age of 20.
Has been treated with numerous drugs, in particular with pyridoxine several times, without result.
Treatment.—BSL: 200 mg./24 hr.
Results.—Spectacular transformation after 48 hours. Treatment continued for 3 months. Improvement maintained.

I claim:

1. A pharmaceutical composition in unit dose form, comprising 25 to 500 mg. of the sodium or potassium salt of 5'-phospho-$N^\epsilon$-pyridoxylidene-lysine and an inert carrier.

2. A pharmaceutical composition according to claim 1, in which the unit dose contains from 50 to 250 mg. of the alkali metal salt.

3. A method according to claim 1, in which the dosage rate is from 50 to 300 mg. of the alkali metal salt per 24 hours.

4. A method for the treatment of a patient exhibiting a disorder associated with a deficiency of pyridoxal phosphate, which comprises administering to the patient a pharmaceutical composition at a dosage rate to give the patient from 25 to 500 mg. of the sodium or potassium salt of 5'-phospho-$N^\epsilon$-pyridoxylidene-lysine per 24 hours.

References Cited

Cordes et al., Biochemistry, vol. 1, No. 5, pp. 773–778, 167–81$B_6$, September 1962.

RICHARD L. HUFF, Primary Examiner

U.S. Cl. X.R.

260—295